Patented Sept. 3, 1940

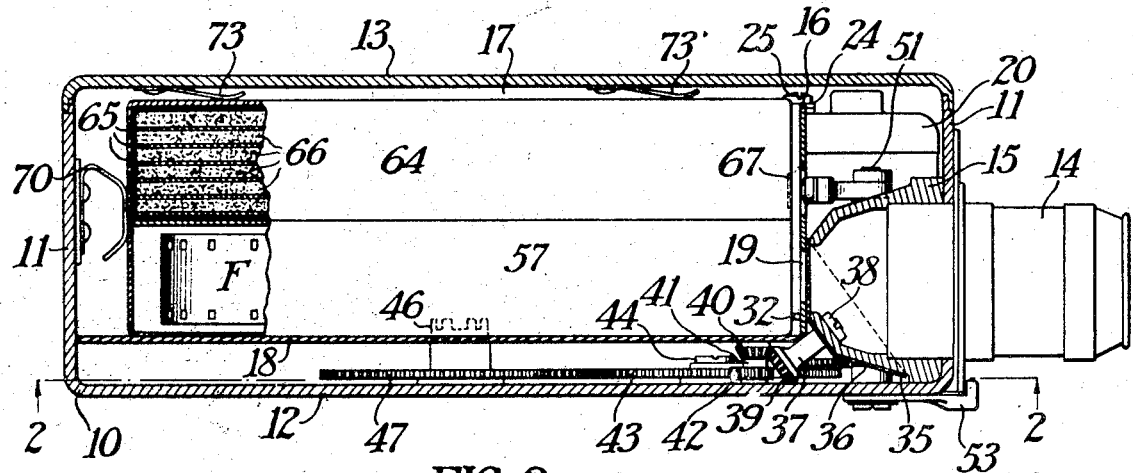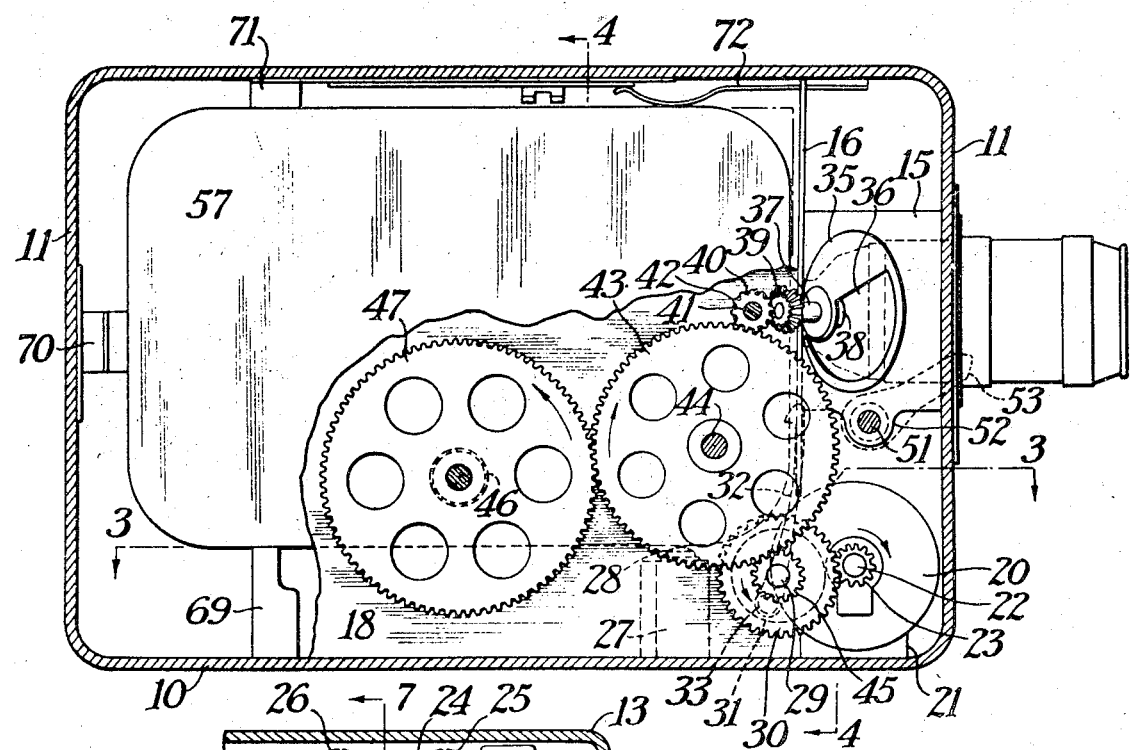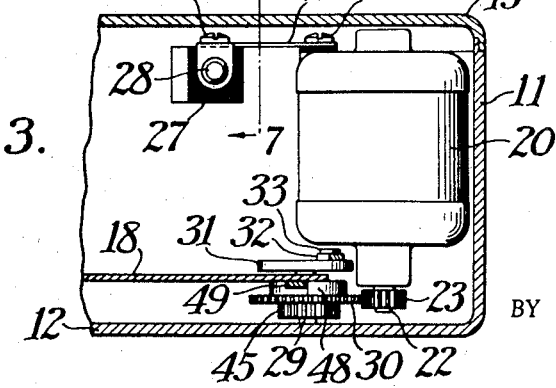

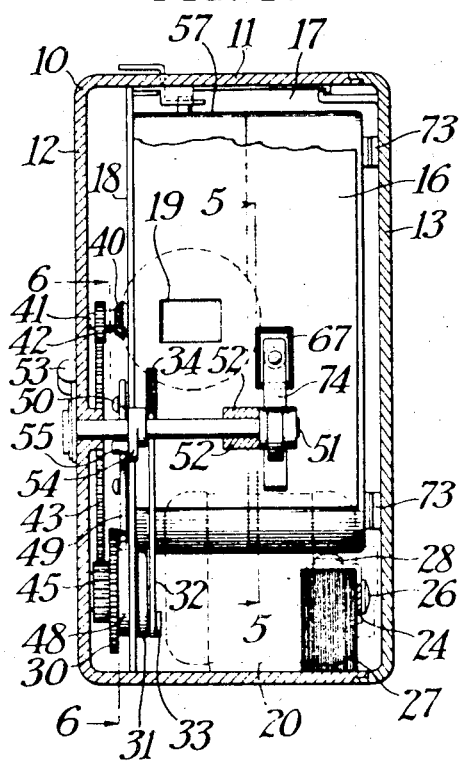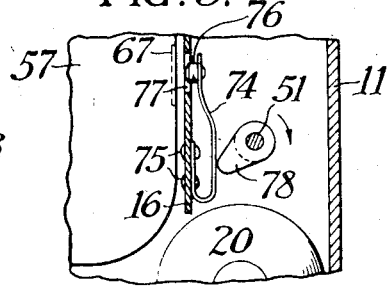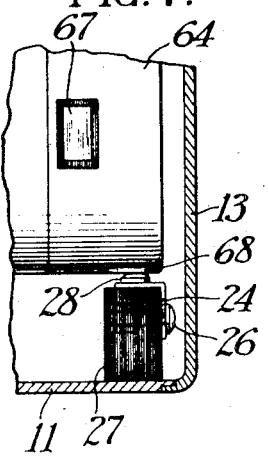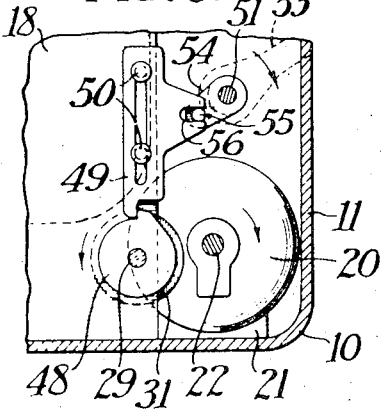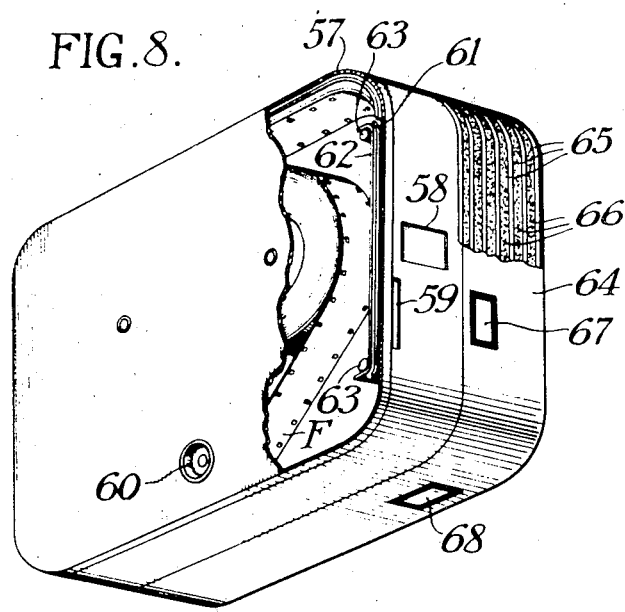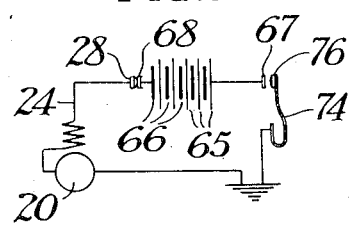

2,213,768

UNITED STATES PATENT OFFICE 2,213,768

PHOTOGRAPHIC APPARATUS OF THE MAGAZINE TYPE

William E. Merriman and Clarence W. Carroll, Rochester, N. Y., assignors to Eastman Kodak Company, Rochester, N. Y., a corporation of New Jersey Application May 15, 1937, Serial No. 142,869

18 Claims. (Cl. 88—17)

The present invention relates to photographic apparatus of the magazine type and more particularly to the provision of a film magazine also containing a source of energy for operation of the apparatus.

Various types of prime movers, such as electric motors, air turbines, etc. are used for driving photographic apparatus and it is also recognized that the source of energy for such prime movers may be replaceable with respect to the apparatus. However, independent replacement of energy containers is inconvenient and often times the need for such replacement is not recognized until the prime mover has failed to operate.

The primary object of the present invention is the provision of a combination between a photographic apparatus of the magazine type including a prime mover for operating the apparatus and a magazine simultaneously containing film to be acted upon by the apparatus and also containing a source of energy for operating the prime mover.

A more specific object of the invention is the combination between a photographic apparatus of the magazine type including an electric motor for driving the film advancing mechanism and a film magazine containing the film operated upon by the apparatus and also containing an electric dry battery which is connected to said electric motor for operation of the film-advancing means.

Another object of the invention is the provision of a magazine type of photographic apparatus including positioning means within the magazine chamber thereof and including a prime mover in combination with a film magazine containing a source of energy which is detachably connected to said prime mover, at least one of said connections also functioning as one of the positioning means for the magazine.

Another more specific object of the invention is the provision of a magazine type of photographic apparatus including a prime mover and positioning members within the magazine chamber of the apparatus in combination with a film magazine also including an electric battery connected to contacts on the magazine, at least one of said positioning members also functioning as a contact for engaging one of the contacts on the magazine.

A further object of the invention is the provision in a magazine type of photographic apparatus including an electric motor and a magazine chamber, of a film magazine also containing an electric battery connected to a pair of contacts on the magazine, a movable contact being provided in the apparatus for movement against one of the contacts on the magazine to form a switch or control means for supervising operation of said motor.

Other and further objects of the invention will be suggested to those skilled in the art by the following description.

The above and other objects of the invention are attained by a photographic apparatus provided with a magazine chamber and including a prime mover for operating the film handling mechanisms in the apparatus in combination with a film magazine containing a film supply adapted to be operated upon by the apparatus and also containing a source of energy which is detachably connected to the prime mover when the magazine is positioned within the apparatus and which source of energy is replaced each time that the supply of film is replaced. The positioning members adjacent the aforementioned magazine chamber locate the film and energy magazine therein and detachable connections transmit the energy from the magazine to the prime mover, at least one positioning member and connection being in common. Finally, the other conection between the source of energy and the prime mover is movable from an inoperative to an operative position to provide a control means for the apparatus.

Reference is hereby made to the accompanying drawings wherein similar reference characters designate similar elements and wherein:

Fig. 1 is a transverse section through the photographic apparatus illustrating the location of the film and energy magazine, a portion of the magazine being broken away to indicate the structure thereof.

Fig. 2 is a partial section of the photographic apparatus taken on the line 2—2 of Fig. 1 and also a side elevation of the magazine and magazine chamber.

Fig. 3 is a partial section on the line 3—3 of Fig. 2 and shows a plan view of the prime mover and one of the combined connection and positioning members.

Fig. 4 is a vertical section of the photographic apparatus taken on the line 4—4 of Fig. 2.

Fig. 5 is a partial section taken on the line 5—5 of Fig. 4.

Fig. 6 is also a partial section taken on the line 6—6 of Fig. 4.

Fig. 7 is a partial section taken on the line 7—7 of Fig. 3.

Fig. 8 is a perspective view of the combined film and energy magazine with portions of the casing broken away to illustrate the internal construction.

Fig. 9 is a wiring diagram of the electric species of the invention.

While the present invention is illustrated as applied to a photographic camera which is operated by an electric motor in combination with a film magazine also containing an electric battery, it is understood that the invention in its scope also contemplates any manner of the photographic apparatus of the magazine type and any type of prime mover which may be operated by a source of energy susceptible of enclosure in a magazine. For instance, a rocket type of prime mover and energy supply could be employed in the performance of the invention without departing from the scope thereof.

In the illustrated embodiment of the invention the camera casing 10 includes an edge wall 11, a side wall 12 and a cover 13 which fits onto the edge wall 11 in light-tight relation thereto. An objective 14 is mounted upon the front edge wall 11 of camera casing 10 and an objective socket 15 is mounted within casing 10 behind objective 14. A front plate 16 is also mounted in the front of the camera and constitutes the front wall of the magazine chamber 17. A mechanism plate 18 extends longitudinally of casing 10 and constitutes the side wall of magazine chamber 17. Front plate 16 is provided with an exposure aperture 19 in alignment with objective 14.

Various film operating mechanisms are provided within the camera and include a film advancing mechanism and a shutter mechanism both operated by a prime mover. The prime mover may comprise an electric motor 20 mounted by a bracket 21 upon the lower portion of edge wall 11. The motor shaft 22 extends from one end of said motor 20 and carries a small spur gear 23. A connection 24 is attached at one end by a screw 25 to one side of motor 20 and at the other end by a screw 26 to an insulating post 27. Said other end of connection 24 includes a contact 28, the function of which will be later explained.

The film advancing mechanism is operated from a counter shaft 29 which carries a gear 30 in mesh with the spur gear 23 on the motor shaft 22. Said film advancing mechanism comprises a driving disc 31 to which one end of film claw 32 is eccentrically pivoted by a crank pin 33. Front plate 16 is also provided with a claw slot 34 through which film claw 32 may extend in a known manner.

The shutter means may be provided in any conventional fashion but is here disclosed as a conical shutter member 35 provided with an opening 36 and pivotally mounted by a shutter shaft 37 and nut member 38 on the rear wall of objective socket 15. Shutter member 35 is driven from counter shaft 29 through the following gear train: a bevel gear 39 on the other end of shutter shaft 37, a bevel gear 40 on a stub shaft 41 mounted upon side wall 12, a small gear 42 on stub shaft 41, a large gear 43 also rotatably mounted on side wall 12 by a bolt 44 and which meshes with a small spur gear 45 on counter shaft 29.

The driving connection to the film magazine includes a clutch member 46 extending into magazine chamber 17, rotatably mounted in mechanism plate 18 and driven by a large gear 47 which meshes with said large gear 43.

The release mechanism for the operating mechanisms of the apparatus is best disclosed in Figs. 4, 5 and 6. Such release mechanism comprises a single-toothed cam 48 mounted upon counter shaft 29, a blocking member 49 slidably mounted by pins 50 upon mechanism plate 18. Said release also includes a shaft 51 rotatably mounted in side wall 12 and in a bushing 52 of objective socket 15. An external finger member 53 is attached to one end of shaft 51. An arm 54 is intermediately attached to shaft 51 and carries a pin 55 engaging a slot 56 in blocking member 49. Upon operation of the external finger member 53 in the direction of the arrow in Fig. 6, blocking member 49 is raised so that the abutment thereon dis-engages the single-toothed cam 48 whereupon the film-advancing mechanism, shutter mechanism and drive to the magazine clutch member 46 may be operated by the prime mover or electric motor 20.

The film and energy magazine contains a film supply which may extend through the film compartment thereof in any desired path. Said magazine comprises a film casing 57 which is provided with an exposure aperture 58 and a claw slot 59 and which carries a rotatable clutch member 60 complementary to clutch member 46 and for engagement therewith. The film strip F is held across exposure aperture 58 by a pressure pad 61 resiliently held against exposure aperture 58 by a spring member 62 which is mounted upon studs 63. When the film and energy magazine is inserted into magazine chamber 17, the exposure aperture 58 is in alignment with exposure aperture 19 in front plate 16 and with objective 14. The passage of light through exposure apertures 19 and 58 is controlled by shutter member 35. The film claw 32 extends through claw slot 59 to engage the perforations along one margin of the film strip F within the magazine. The constructions and arrangements thus far described are quite conventional and well known.

The film and battery magazine also includes a battery casing 64 which contains the source of energy preferably in the form of laminated dry cell elements comprising alternate layers of zinc 65 and of electrolytic paste 66, both of known composition and properties. One group of layers 65 is connected in any suitable or well known manner to a contact 67 on the front casing 64, while the other group of layers 66 is connected in a similar manner to a contact 68 on the bottom of casing 64. Of course, it is understood that the location of contacts 67 and 68 may vary as the design of the photographic apparatus dictates.

A support 69 extends from the lower edge wall 11 of camera casing 10 for supporting the lower edge of the film and battery magazine. A plurality of positioning members, such as springs 70, 71, 72, see Fig. 2, and 73, see Fig. 1, engage the sides of the film and battery magazine to hold it in position within the magazine chamber 17 with exposure aperture 58 and claw slot 59 in operative relation to the objective 14 and film claw 32, respectively. At the same time contact 68 in the lower wall of the film and battery magazine bears against the contact 28 on the end of connection 24 to establish an electric connection between one side of the electric dry cell battery and one side of motor 20. It is thus evident that contact 28 simultaneously functions to establish the aforementioned electric contact and to locate or position the film and battery magazine properly within magazine chamber 17.

The control for the connection of the energy source to the prime mover may be provided in any desired manner but an advantageous arrangement of such a control is disclosed herein. A spring arm 74 is mounted by rivets 75 upon the front plate 16. A contact 76 is mounted on the end of arm 74 and may move through opening 77 in front plate 16 into engagement with the contact 67 on the front wall of the film and battery magazine. Spring arm 74 is mounted so that under normal conditions contact 76 is spaced from contact 67 and the connection between the source of energy and prime mover is normally interrupted. A cam arm 78 is mounted upon the shaft 51 of the release. When cam arm 78 is rotated in the direction of the arrow in Fig. 5, spring arm 74 is moved so that contact 76 engages contact 67 to complete the connection between the energy source and the prime mover. Cam arm 78 is relatively positioned with respect to arm 54 and pin 55 must raise blocking member 49 for disengagement of the abutment on the blocking member and the single-toothed cam 48 before contact 76 engages contact 67. By such timing arrangement it is insured that the operating mechanisms of the camera will be released for operation by the motor 20 before said motor 20 is energized by the dry battery. Hence, the motor cannot be energized and endeavor to drive the various camera mechanisms before the external release member has been operated to free the film-advancing and shutter mechanisms. This same relative arrangement of cam arm 78 and arm 54 also insures that when the finger member 53 is released for return to blocking position that contacts 67 and 76 will be separated due to the normal action of spring 74 before arm 54 and pin 55 have permitted blocking member 49 to engage the single-toothed cam 48 and stop the film-advancing and shutter mechanisms in a predetermined position.

In order to avoid fogging of one or more frames in the film magazine, it is quite necessary to stop the camera mechanisms in a definite position with the shutter member 35 in closed position, obviously this desired condition cannot be obtained by merely interrupting the contacts 67 and 76 and permitting the motor to come to a normal stop. However, the arrangement proposed does not permit the release or blocking mechanism to function until the motor has been de-energized and is already coasting to a stop.

The circuit from the battery to the motor is indicated diagrammatically in Fig. 9. One side of the battery, such as the zinc plates 65, is connected to the contact 67. The normally open contact 76 on spring arm 74 is connected to ground or to the front plate 16 and camera casing 10. The other side of the battery, such as the layers of electrolytic paste 66, is connected to the contact 68, through contact 28 and connection 24 to one side of the motor 20, the other side of the motor being grounded to complete the circuit or being connected to the camera casing 10 in a known manner.

The basic concept of the present invention is the combination between a magazine type photographic apparatus and a film and energy magazine. The outstanding advantages of such a combination are that a new supply of energy is incorporated into the apparatus with each new supply of film. From a commercial standpoint film and batteries both have the same shelf life so that as long as the film is in condition for use, the battery will also retain sufficient energy for moving the film through the apparatus. The source of energy is preferably of sufficient quantity to operate the photographic apparatus and to move the entire film supply therethrough either continuously or at intervals. Furthermore, the operator need no longer pay any attention to the provision of power for the apparatus and the undesirable repeated windings of a spring motor are eliminated. The present invention also has a distinct advantage over the use of larger batteries for running several supplies of film through the apparatus in that the operator is not aware of the exhaustion of the larger batteries which may become discharged in the middle of a film supply to the great inconvenience of the operator and possible loss of an important scene.

Since other and further modifications of the present invention are possible without departing from the scope thereof, the present disclosure is to be construed in an illustrative sense, the scope of the invention being defined in the appended claims.

Having now particularly described our invention, what we desire to secure by Letters Patent of the United States and what we claim is:

1. The combination with a photographic apparatus of the magazine type including operating mechanisms for acting upon a photographic film and including a prime mover operatively connected to said mechanisms and requiring for its operation a supply of energy, of a single receptacle containing the film to be acted upon by said mechanisms and also containing a source of potential energy for the energization and operation of said prime mover and adapted as a unit to be associated with or removed from said mechanisms and prime mover.

2. The combination with a photographic apparatus comprising optical means and mechanical means for acting upon a photographic film, and a prime mover operatively connected to said mechanical means and requiring for its operation a supply of energy, of a unitary container enclosing the film to be acted upon by said optical means and mechanical means and also enclosing a source of energy for the energization and operation of said prime mover, and detachable connections between said container and said prime mover and which are rendered operative automatically for transferring energy to said prime mover when said container is placed in cooperative relation to the optical means and mechanical means of said apparatus.

3. The combination with a photographic apparatus comprising an optical means for association with a film strip, film advancing means for moving a film strip past said optical means, and an electric motor operatively connected to said film advancing means, of a unitary magazine containing the film strip and also containing an electric dry battery, both of which have substantially the same shelf life, and relatively arranged so that upon operative association of said film strip in said magazine with said optical means and said film advancing means then said battery is connected for operation of said motor.

4. A photographic apparatus of the magazine type, the combination with a housing providing a magazine chamber which is adapted to receive a film and battery magazine, a driving mechanism in said housing and adapted for detachable connection to said magazine to move the film therein, and an electric motor operatively connected to said driving mechanism, of contacts electrically connected to said motor and relatively located within said apparatus so as to be automatically and electrically connected to the battery in said magazine for energization and operation of said motor when said film and battery magazine is placed in said chamber for operative association of the film with said driving mechanism.

5. In a photographic apparatus of the magazine type, the combination with a housing providing a magazine chamber which is adapted to receive a film and battery magazine, a driving mechanism in said housing and adapted for detachable connection to said magazine to move the film therein, and an electric motor operatively connected to said driving mechanism, of a plurality of positioning members adjacent said magazine chamber and adapted to locate said film and battery magazine within said chamber, and contacts electrically connected to said motor and adapted to be electrically connected to the battery in said film and battery magazine, at least one of said contacts also constituting one of said positioning members.

6. In a photographic apparatus of the magazine type, the combination with a housing providing a magazine chamber which is adapted to receive a film and battery magazine, a driving mechanism in said housing and adapted for detachable connection to said magazine to move the film therein, and an electric motor operatively connected to said driving mechanism, of a fixed contact electrically connected to said motor and located for connection to the battery in said film and battery magazine, and a movable contact also electrically connected to said motor and adapted to be moved into connection with the battery in said film and battery magazine but normally spaced from said magazine to provide a control switch.

7. In a photographic apparatus of the magazine type, the combination with a housing providing a magazine chamber which is adapted to receive a film and battery magazine, a driving mechanism in said housing, adapted for detachable connection to said magazine to move the film therein, and including a clutch member, and an electric motor operatively connected to said driving mechanism, of a switch means electrically connected to said motor and adapted to be electrically connected to the battery in said film and battery magazine, and a control means including a stop for engaging said clutch member of the driving mechanism to stop the same and including an actuating member located to close said switch means only after said stop has disengaged said clutch member.

8. In a photographic apparatus of the magazine type, the combination with a housing providing a magazine chamber which is adapted to receive a film and battery magazine, a driving mechanism in said housing, adapted for detachable connection to said magazine to move the film therein, and including a clutch member and an electric motor operatively connected to said driving mechanism, of a switch means electrically connected to said motor and adapted to be electrically connected to the battery in said film and battery magazine, and a control means including a stop for engaging said clutch member of the driving mechanism to stop the same and including an actuating member located to cause said switch means to open before said stop engages said clutch member.

9. In a photographic apparatus of the magazine type, a combination with a housing providing a magazine chamber which is adapted to receive a film and battery magazine, a driving mechanism in said housing, adapted for detachable connection to said magazine to move the film therein and including a clutch member, and an electric motor operatively connected to said driving mechanism, of a normally open switch means electrically connected to said motor and adapted to be electrically connected to the battery in said film and battery magazine, and a control means including a stop arranged to engage said clutch member and to stop the driving mechanism in a predetermined position and including an actuating member for closing said switch means and located with respect to said stop so that the switch means is not closed until said stop is disengaged and so that said stop is not engaged until said switch means has opened.

10. In a photographic apparatus of the magazine type, the combination with a housing providing a magazine chamber which is adapted to receive a film and battery magazine, a driving mechanism in said housing, adapted for detachable connection to said magazine to move the film therein, and including a clutch member, and an electric motor operatively connected to said driving mechanism, of a movable contact electrically connected to said motor and adapted normally to be spaced from said battery in said film and battery magazine, and a control means on said housing including a stop for engaging said front of the driving mechanism to prevent operation thereof and including an actuating member for moving said movable contact into electrical connection with the battery of said film and battery magazine, said stop and said actuating member being relatively located so that said electrical connection is not made until said stop has disengaged said clutch member and so that said stop cannot engage said clutch member until the movable contact has broken said electrical connection.

11. A photographic film and energy magazine for unitary association with and removal from a photographic apparatus comprising a casing providing a film compartment and an energy storage compartment, a supply of film in said film compartment, and a source of energy in said storage compartment.

12. A photographic film and energy magazine for unitary association with and removal from a photographic apparatus comprising a casing having an intermediate partition dividing said casing into a film compartment and an energy storage compartment, a supply of film in said film compartment and a source of potential energy in said storage compartment.

13. A photographic film and battery magazine for unitary association with and removal from a photographic apparatus, comprising a casing providing a film compartment and a battery compartment, a supply of film in said film compartment, and a dry cell electric battery within said battery compartment, said supply of film and said battery having substantially the same keeping qualities.

14. A photographic film and battery magazine for unitary association with and removal from a photographic apparatus, comprising a casing providing a film compartment and a battery compartment, a supply of film in said film compartment, and a dry cell electric battery composed of alternate layers of zinc and electrolytic paste within said battery compartment.

15. A photographic film and battery magazine for unitary association with and removal from a photographic apparatus, comprising a casing providing a film compartment and a battery compartment, a supply of film in said film compartment, and a dry cell electric battery composed of alternate layers of zinc and electrolytic paste corresponding in outline to the shape of said magazine within said battery compartment, said supply of film and said dry cell battery having substantially the same shelf life.

16. A photographic film and battery magazine for unitary association with and removal from a photographic apparatus, comprising a casing providing a film compartment and a battery compartment, a supply of film in said film compartment, a dry cell electric battery within said battery compartment, and a contact mounted in said casing, connected to said battery and available from the exterior of said magazine.

17. A photographic film and battery magazine for unitary association with and removal from a photographic apparatus, comprising a casing providing a film compartment and a battery compartment, a supply of film in said film compartment, said casing being provided with an exposure aperture through which said film may be exposed, and a dry cell electric battery within said battery compartment.

18. A motion picture film magazine for unitary association with and removal from a photographic apparatus comprising a casing having a lateral wall and a central wall providing a film compartment and a battery compartment, film supporting members for motion picture film within said film compartment, said lateral wall adjacent said film compartment being provided with an exposure aperture and a claw slot, an electric dry battery within said battery compartment, and a pair of contacts in said lateral wall and connected to opposite sides of said electric battery.

WILLIAM E. MERRIMAN.
CLARENCE W. CARROLL.